US011758121B2

(12) United States Patent
Yautz et al.

(10) Patent No.: US 11,758,121 B2
(45) Date of Patent: *Sep. 12, 2023

(54) VALIDATION OF A CAMERA CLEANING SYSTEM

(71) Applicant: Argo AI, LLC, Pittsburgh, PA (US)

(72) Inventors: Dustin Ryan Yautz, Wexford, PA (US); Morgan M. Wagner, Pittsburgh, PA (US); Eric K. Thong, Palo Alto, CA (US); Christopher N. St. John, Northville, MI (US)

(73) Assignee: Argo AI, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,588

(22) Filed: Jun. 20, 2022

(65) Prior Publication Data
US 2023/0007234 A1    Jan. 5, 2023

Related U.S. Application Data

(63) Continuation of application No. 17/020,297, filed on Sep. 14, 2020, now Pat. No. 11,368,672.

(51) Int. Cl.
*H04N 17/00* (2006.01)
*G06V 10/25* (2022.01)
*G06F 18/22* (2023.01)

(52) U.S. Cl.
CPC ........... *H04N 17/002* (2013.01); *G06F 18/22* (2023.01); *G06V 10/25* (2022.01)

(58) Field of Classification Search
CPC ...... H04N 17/00; H04N 17/02; H04N 17/002; H04N 7/18; H04N 5/217; H04N 5/225; G06V 10/25; G06F 18/22
(Continued)

(56) References Cited

U.S. PATENT DOCUMENTS 8,493,505 B2    7/2013   Chen
8,532,396 B2    9/2013   Rezazadeh et al.
(Continued)

FOREIGN PATENT DOCUMENTS

WO    2019144262 A1    8/2019

OTHER PUBLICATIONS

Extended European Search Report from the European Patent Office of European application No. 21196586.9 dated Feb. 2, 2022, 8 pages.

(Continued)

*Primary Examiner* — Trang U Tran
(74) *Attorney, Agent, or Firm* — FOX ROTHSCHILD LLP (57) ABSTRACT

Devices, systems, and methods are provided for testing and validation of a camera. A device may capture a first image of a target using a camera, wherein the camera is in a clean state, and wherein the target is in a line of sight of the camera. The device may apply an obstruction to a portion of a lens of the camera. The device may apply a camera cleaning system to the lens of the camera. The device may capture a post-clean image after applying the camera cleaning system. The device may determine a post-clean SSIM score based on comparing the post clean image to the first image. The device may compare the post-clean SSIM score to a validation threshold. The device may determine a validation state of the camera cleaning system based on the comparison.

20 Claims, 7 Drawing Sheets

(58) Field of Classification Search
USPC .................................................. 348/187, 148
See application file for complete search history.

(56) References Cited

U.S. PATENT DOCUMENTS

| | | |
|---|---|---|
| 9,253,375 B2 | 2/2016 | Milanfar et al. |
| 9,813,593 B2 | 11/2017 | Akiyama et al. |
| 10,928,819 B2 | 2/2021 | Viswanathan |
| 11,276,156 B2* | 3/2022 | Wang .................... G06T 7/0002 |
| 11,328,428 B2* | 5/2022 | Kahlbaum ............ G06T 7/0002 |
| 11,451,690 B2* | 9/2022 | Sato ........................ B08B 1/006 |
| 2013/0300869 A1 | 11/2013 | Lu et al. |
| 2015/0078670 A1 | 3/2015 | Reibman et al. |
| 2015/0161773 A1 | 6/2015 | Takahashi et al. |
| 2016/0004144 A1 | 1/2016 | Laroia et al. |
| 2016/0379094 A1 | 12/2016 | Mittal et al. |
| 2017/0109590 A1 | 4/2017 | Gehrke |
| 2017/0313288 A1 | 11/2017 | Tippy et al. |
| 2019/0164271 A1 | 5/2019 | Herchenbach et al. |
| 2019/0281302 A1 | 9/2019 | Zhang et al. |
| 2019/0369031 A1 | 12/2019 | Niikura et al. |
| 2020/0055516 A1 | 2/2020 | Craddock et al. |
| 2020/0065622 A1 | 2/2020 | Korosi-Szabo et al. |
| 2020/0094785 A1 | 3/2020 | Herman et al. |

OTHER PUBLICATIONS

Krishnan, V., "Self-Driving Bugaloo: How Ford is Keeping Autonomous Car Sensors Squeaky Clean", Ford Motor Company, Sep. 4, 2019, United States.

Li et al., "Content-Partitioned Structural Similarity Index For Image Quality Assessment", Signal Processing: Image Communication, 2010, pp. 517-526, vol. 25, issue 7, ScienceDirect.

\* cited by examiner

VALIDATION OF A CAMERA CLEANING SYSTEM

CROSS-REFERENCE TO RELATED APPLICATIONS

This application is a continuation of U.S. application Ser. No. 17/020,297 filed Sep. 14, 2020, the disclosure of which is hereby incorporated in its entirety by reference herein.

TECHNICAL FIELD

This disclosure generally relates to devices, systems, and methods for validation of a camera cleaning system.

BACKGROUND

Many vehicles use one or more cameras for various purposes. For example, a camera mounted on a vehicle may be coupled to an image processing device that processes images to detect objects in the vicinity of the vehicle. Proper operation of a camera in the presence of some amount of obstruction is an important aspect of the camera. The camera should not be interrupted from its normal function under the presence of obstructions. Some of these obstructions may include debris, mud, rain, bugs, or other obstructions that may hinder the normal operation of the camera. These obstructions may alter the image quality of the camera after getting deposited on the camera lens. Thus, there is a need to enhance the testing and validation of a camera to ensure that obstructions do not cause inconsistent or unreliable image quality that undermines the camera's normal operation.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for enhanced multi spectral sensor calibration.

In one or more embodiments, a camera cleaning validation system may facilitate the setup of a camera in an obstruction environment which is constrained in both its required setup as well as the environment it is in. A device (e.g., a camera) should not be interrupted from its normal function. For example, if an obstruction is deposited on the lens of a camera, a camera cleaning system should be applied in order to attempt to return the camera to its normal function by clearing the obstruction off of the camera lens to a certain degree.

In one or more embodiments, a camera cleaning validation system may combine a scale-invariant target with a target-independent camera metric, which allows a wide variety of errors in camera performance to be detected from an expected baseline without an application-specific behavior being required. An application-specific behavior may be tied to the type of tests being performed, such as sharpness test, blurred lines test, resolution test, modulation transfer function (MTF), chromatic aberration test, white balance, color response, color error, and any other specific tests.

In one or more embodiments, a camera cleaning validation system may facilitate a validation test for a camera under test. A camera cleaning validation system may provide a mechanism to allow a pass or fail criteria to be judged on the camera under test in real-time during the testing and provides a target framework and a backend processing framework together in real-time application. A camera cleaning validation system may allow for a testing and validation environment that does not necessarily require tuning the camera for ideal lightning conditions, setup, distance, etc., which are typically required by camera tests. That is, it is not necessary to determine pixel sizes or determine a specific color palette, which is typically used to perform image quality tests. A controlled environment not required, but rather a camera cleaning validation system may reduce the noise level from the environment. In fact, the camera cleaning validation system may allow more variation in the test setup to achieve a higher level of repeatability and reproducibility, which in turn allows higher resolution to differentiate between 'pass' and 'fail' conditions.

In one or more embodiments, a camera cleaning validation system may facilitate an application-independent methodology by using a metric associated with the validation of a camera system. That is, the ability to measure the camera's sensitivity to the obstruction that is applied (regardless of actual cleaning performance). In this case, multiple obstructed states may be compared to the baseline 'normal' state. The metric may be described in the notion of a normal state and the notion of interrupted or fail state based on the presence of an obstruction on the lens of a camera. For example, a camera cleaning validation system may facilitate that a quality of a captured optical signal is independent of the camera's resolution, field-of-view, orientation, lightning, or specific knowledge of the application of the camera's data. The camera cleaning validation system may facilitate a generalized pass or fail criteria independent of the metric, under a degraded event, yet still be relevant to a broad set of applications (e.g., recognizing faces, cars, etc.). The signal received from a degraded event using a particular image (e.g., spilled coins image) is independent of the camera's application but still represent correctness to a wide variety of camera applications.

Therefore, a camera cleaning validation system would lend itself to a before and after judgment and a notion of using a particular index that will allow a before and after score to whether a camera system is performing to a predetermined level. The score may be tied to image quality by using a particular index. In one or more embodiments, a camera cleaning validation system may facilitate a structural similarity index measurement (SSIM) to be used as the particular index. The SSIM may be a perceptual metric that quantifies image quality degradation caused by processing an image. SSIM may provide a measure of the perceptual difference between two images. SSIM allows for a more generalized set of scores that apply more broadly to a large set of image applications. For example, traditional image quality metrics such as slanted edges, color charts, or other metrics require an analysis of different metrics to get the full picture, whereas SSIM provides a simpler way to capture failure modes independent of the application. SSIM provides an index associated with a large amount of information while using one score. A benefit to the SSIM metric is that it can capture image degradation continuously across the whole image, whereas the slanted edge and sharpness targets can only measure localized changes. Measuring uniform changes across the image is important because 1) a localized obstruction may not land precisely on the slant edge or sharpness marker region and 2) it provides a broader picture of the uniformity of the obstruction. As long as a known good environment is established, there is no need to calibrate a color chart or other metrics before capturing an SSIM score. In this case, SSIM would provide a pass or fail score which is a simple way to capture failure conditions. SSIM helps measure a target's noise structure, luminance, and other factors to understand the general image quality degradation between a dirty sensor and a clean sensor. SSIM also gives a general score for the entire target or a cropped region of the target.

In one or more embodiments, a camera cleaning validation system may use a particular pattern associated with the application-independent methodology used to validate a camera system under test where an obstruction may have been deposited on a lens of a camera. The particular pattern may be used in conjunction with an SSIM scale in the before and after judgment. The particular pattern may comprise a variety of textures and frequency of content that allows it to be applied to a different camera field of use, different camera distances, and becomes agnostic of the camera system set up compared to other approaches in performing optical tests. The particular pattern may be a spilled coins image, which is typically used to measure a texture sharpness. A spilled coins image is an image processing pattern that allows the evaluation of sharpness. It has a frequency of content pattern which allows it to judge that had a variety of extra detail levels. Other types of sharpness targets do not capture that as well.

In one or more embodiments, a camera cleaning validation system may facilitate a novel linkage of applying a metric (e.g., SSIM) to a camera system under the introduction of an obstruction to the lens of a camera. The camera may be related to one of wide-field view cameras, stereo cameras, automotive cameras, backup cameras, color or monochrome cameras, autonomous vehicle cameras, or anything that utilizes an optical path.

In one or more embodiments, a camera cleaning validation system may facilitate judging whether a processing circuitry of a vehicle would perceive an image captured by a camera of the vehicle to be what it is supposed to be when the camera is subjected to the obstruction. The testing and validation may be performed quickly and effortlessly independently from the judgment criteria that would have to be derived from some image quality standard metric or some image quality specification, for example, a sharpness test.

In one or more embodiments, a camera cleaning validation system may facilitate the processing of an SSIM score over a plurality of samples to determine regions of worst SSIM performance of the camera system before and after applying a camera cleaning system to attempt to return the camera to its normal function by clearing the obstruction off of the camera lens. For example, regions with worst SSIM (e.g., worst performance) based on a comparison to a validation threshold are boxed such that it may be determined that one area of the camera lens is performing better than the boxed regions. A global SSIM may be determined based on capturing an image, down-sampling the image, taking SSIM scores of the down-sampled image, and repeating this process multiple times. The global SSIM may be measured by looking at the average of the changes in each individual pixel. The global SSIM enables the SSIM to be evaluated in a localized region of the image. This is effective at detecting small localized regions of obstructions (e.g., droplets, splats, or globs of material) that are very significant but would be removed from the global SSIM calculation. Downsampling can be achieved by taking a reference and distorted image signals as input, the system iteratively applies a low-pass filter and downsamples the filtered image by a factor of 2. This may be performed at the clean state, the dirty state, and the post-cleaning state. A captured image is down-sampled to remove noise resulting from factors such as distance, lighting, resolution, field-of-view, orientation, etc. After down-sampling, SSIM scores are taken of the various regions of the down-sampled image. This process may be repeated multiple times to minimize the effect of noise (e.g., obstruction). The global SSIM score may be determined based on averaging the SSIM scores associated with each down-sampled image. This global SSIM score has the benefit of being independent of setup, quality of the lighting, distance, resolution, field-of-view, orientation, or other camera dependent conditions. The down-sampling may be performed using software.

In one or more embodiments, a camera cleaning validation system may impose a threshold to create the boxed regions associated with the worst SSIM scores. For example, any localized SSIM score that is greater than the threshold is associated with a lighter color on the a visual representation of the localized SSIM scores and any SSIM score that is lower than the threshold may be associated with a darker color on a visual representation of the localized SSIM score. Further, regions of darker colors that are connected may be represented by a box drawn around those regions when the connected regions are larger than a given size, for example, 10×10 pixels. Taking 10×10 pixels as an example, regions that are connected together but are smaller than 10×10 pixels may be considered as insignificant imperfection. It should be understood that darker regions on the global SSIM score have worse SSIM scores than lighter regions.

In one or more embodiments, a camera cleaning validation system may facilitate that the system administrator may analyze the global SSIM score to determine regions that are boxed and are below the threshold to conclude that the corresponding region of the camera lens has not properly been cleaned using the camera cleaning system. This may also indicate that the cleaning system may need to be adjusted to address those regions in an attempt to restore the camera lens to its original operating state. This analysis may also indicate whether the camera cleaning system does not pass the operating threshold and may be considered to be defective. However, if the camera cleaning system was capable of addressing the boxed region by clearing the obstruction from those regions having a low SSIM score, then the camera cleaning system may be considered to pass the operating threshold and is adequate.

The threshold above descriptions are for purposes of illustration and are not meant to be limiting. Numerous other examples, configurations, processes, etc., may exist, some of which are described in greater detail below. Example embodiments will now be described with reference to the accompanying figures.

Figure 1:
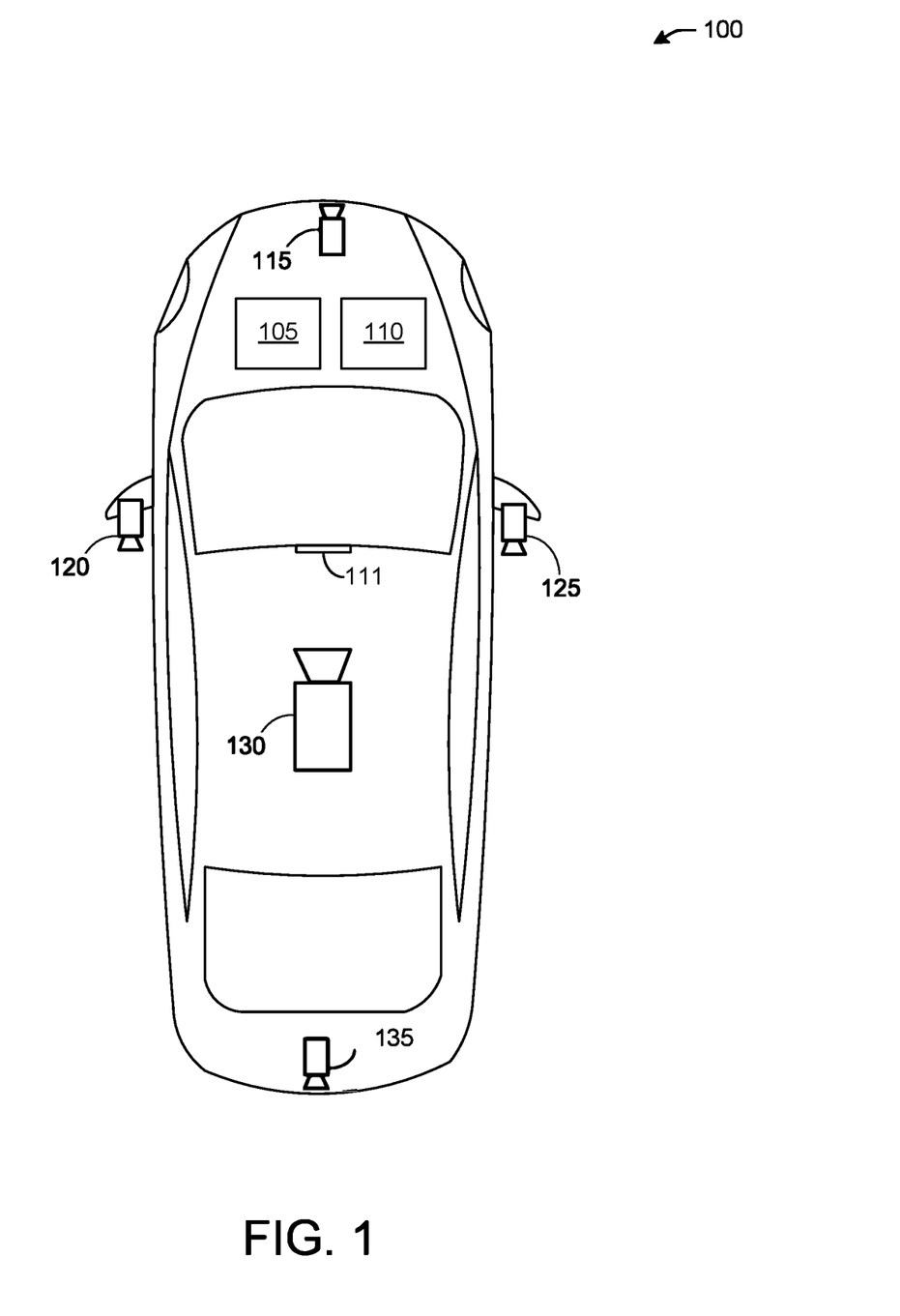
FIG. 1 illustrates an exemplary vehicle equipped with multiple cameras, in accordance with one or more example embodiments of the present disclosure.

FIG. 1 illustrates an exemplary vehicle 100 equipped with multiple cameras. The vehicle 100 may be one of the various types of vehicles such as a gasoline-powered vehicle, an electric vehicle, a hybrid electric vehicle, or an autonomous vehicle, and can include various items such as a vehicle computer 105 and an auxiliary operations computer 110.

The vehicle computer 105 may perform various functions such as controlling engine operations (fuel injection, speed control, emissions control, braking, etc.), managing climate controls (air conditioning, heating, etc.), activating airbags, and issuing warnings (check engine light, bulb failure, low tire pressure, a vehicle in a blind spot, etc.).

The auxiliary operations computer 110 may be used to support various operations in accordance with the disclosure. In some cases, some or all of the components of the auxiliary operations computer 110 may be integrated into the vehicle computer 105. Accordingly, various operations in accordance with the disclosure may be executed by the auxiliary operations computer 110 in an independent manner. For example, the auxiliary operations computer 110 may carry out some operations associated with providing camera settings of one or more cameras in the vehicle without interacting with the vehicle computer 105. The auxiliary operations computer 110 may carry out some other operations in cooperation with the vehicle computer 105. For example, the auxiliary operations computer 110 may use information obtained by processing a video feed from a camera to inform the vehicle computer 105 to execute a vehicle operation such as braking.

In the illustration shown in FIG. 1, the vehicle 100 is equipped with five cameras. In other scenarios, fewer or a greater number of cameras may be provided. The five cameras include a front-facing camera 115, a rear-facing camera 135, a roof-mounted camera 130, a driver-side mirror camera 120, and a passenger-side mirror camera 125. The front-facing camera 115, which may be mounted upon one of various parts in the front of the vehicle 100, such as a grille or a bumper, produces images that may be used, for example, by the vehicle computer 105 and/or by the auxiliary operations computer 110, to interact with an automatic braking system of the vehicle 100. The automatic braking system may slow down the vehicle 100 if the images produced by the front-facing camera 115 indicate that the vehicle 100 is too close to another vehicle traveling in front of the vehicle 100.

Any of the various cameras (e.g., cameras 115, 120, 125, 130, and 135) should not be interrupted from its normal function under the presence of obstructions such as debris, mud, rain, bugs, or other obstructions that hinder the normal operation of the camera. Captured data by the cameras (e.g., cameras 115, 120, 125, 130, and 135) may be raw data that is sent to a vehicle computer 105 and/or by the auxiliary operations computer 110 order to convert the optical image into processed signals. Therefore, it is desirable to enhance the testing and validation of these various cameras before real-world applications (e.g., being on the road) to ensure that they do not provide inconsistent or unreliable image quality that undermines their normal operation.

The rear-facing camera 135 may be used, for example, to display upon a display screen of an infotainment system 111, images of objects located behind the vehicle 100. A driver of the vehicle 100 may view these images when performing a reversing operation upon the vehicle 100.

The roof-mounted camera 130 may be a part of an autonomous driving system when the vehicle 100 is an autonomous vehicle. Images produced by the roof-mounted camera 130 may be processed by the vehicle computer 105 and/or by the auxiliary operations computer 110 for detecting and identifying objects ahead and/or around the vehicle. The roof-mounted camera 130 can have a wide-angle field-of-view and/or may be rotatable upon a mounting base. The vehicle 100 can use information obtained from the image processing to navigate around obstacles.

The driver-side mirror camera 120 may be used for capturing images of vehicles in an adjacent lane on the driver side of the vehicle 100 and the passenger-side mirror camera 125 may be used for capturing images of vehicles in adjacent lanes on the passenger side of the vehicle 100. In an exemplary application, various images captured by the driver-side mirror camera 120, the passenger-side mirror camera 125, and the rear-facing camera 135 may be combined by the vehicle computer 105 and/or by the auxiliary operations computer 110 to produce a computer-generated image that provides a 360-degree field-of-coverage around the vehicle 100. The computer-generated image may be displayed upon a display screen of the infotainment system 111 to assist the driver drive the vehicle 100.

The various cameras provided in the vehicle 100 can be any of various types of cameras and can incorporate various types of technologies. For example, a night-vision camera having infra-red lighting and sensors may be used for capturing images in low light conditions. The low light conditions may be present, for example, when the vehicle 100 is parked at a spot during the night. The images captured by the night-vision camera may be used for security purposes such as for preventing vandalism or theft. A stereo camera may be used to capture images that provide depth information that may be useful for determining separation distance between the vehicle 100 and other vehicles when the vehicle 100 is in motion. In another application where minimal processing latency is desired, a pair of cameras may be configured for generating a high frame-rate video feed. The high frame-rate video feed may be generated by interlacing the video feeds of the two cameras. In yet another application, a camera system configured for light detection and ranging (LIDAR) applications may be used. LIDAR applications can include long-distance imaging and/or short distance imaging. Some camera systems may include power-saving features that may be useful for operations in certain environments.

In one or more embodiments, a camera cleaning validation system may facilitate the setup of a camera (e.g., cameras 115, 120, 125, 130, or 135) in a test environment which may be constrained in both its required setup as well as the environment it is in. Cameras (e.g., cameras 115, 120, 125, 130, and 135) may be subjected to obstructions before being introduced in real-world scenarios where the cameras need to operate at an optimal level to ensure quality images are being captured and processed with minimal errors. A camera (e.g., cameras 115, 120, 125, 130, or 135) may be interrupted from its normal function under the presence of an obstruction, which would alter the image quality captured by the camera. For example, obstructions may include debris, mud, rain, bugs, or other obstructions that hinder the normal operation of the camera. These obstructions may cause interference and alteration of the image quality of a camera. It is important to note that an obstruction can reduce the image quality in any combination of a uniform obstruction or a single or series of localized obstructions.

In one or more embodiments, a camera cleaning validation system may provide a mechanism to allow a pass or fail criteria to be judged on a camera (e.g., cameras 115, 120, 125, 130, or 135) under test in real-time during the testing and provides a target framework and a backend processing framework together because of the real-time application. A camera cleaning validation system may allow for a testing and validation environment that does not require having to tune the camera (e.g., cameras 115, 120, 125, 130, or 135) for ideal lightning conditions, setup, distance, etc., which are typically required by camera tests. That is, there is no need to determine pixel sizes, determine a specific color palette, which is typically used to perform tests.

In one or more embodiments, a camera cleaning validation system may facilitate a structural similarity index measurement (SSIM) to be used as the particular index. It should be noted that other options may also be used as the particular index based on the camera application. Other metrics or targets could be used instead of SSIM. For example, a sharpness or texture or signal-to-noise metric may be used instead of SSIM. An important aspect of the camera cleaning validation system is that it facilitates 1) comparing the clean (baseline) and post-clean (sample) images and 2) evaluating both global and localized performances. The SSIM may be a perceptual metric that quantifies image quality degradation caused by processing an image. SSIM may provide a measure of the perceptual difference between two images.

In one or more embodiments, a camera cleaning validation system may use a particular pattern associated with the application-independent methodology used to validate a camera system under test where an obstruction may have been deposited on a lens of a camera. The particular pattern may be used in conjunction with an SSIM scale in the before and after judgment. The particular pattern may comprise a variety of textures and frequency of content that allows it to be applied to a different camera field of use, different camera distances, and becomes agnostic of the camera system set up compared to other approaches in performing optical tests. The particular pattern may be a spilled coins image, which is typically used to measure a texture sharpness. A spilled coins image is an image processing pattern that allows the evaluation of sharpness. It has a frequency of content pattern which allows it to judge that had a variety of extra detail levels. Other types of sharpness targets do not capture that as well.

It is understood that the above descriptions are for purposes of illustration and are not meant to be limiting.

Figure 2:
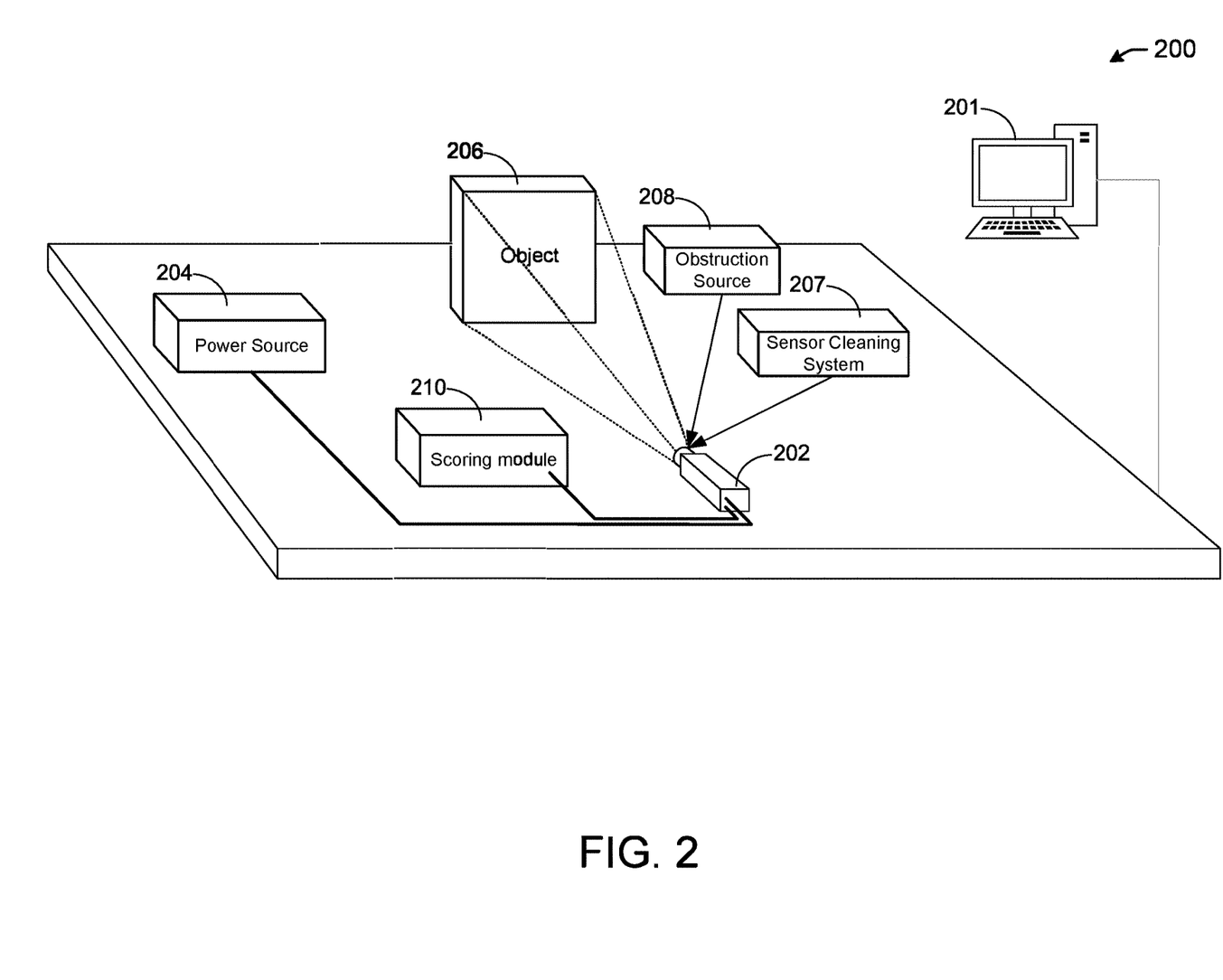
FIG. 2 depicts an illustrative schematic diagram for camera cleaning validation, in accordance with one or more example embodiments of the present disclosure.

FIG. 2 depicts an illustrative schematic diagram for testing and validation, in accordance with one or more example embodiments of the present disclosure.

Referring to FIG. 2, there is shown a camera cleaning validation system 200 for verifying the status of a camera 202. The camera cleaning validation system 200 may be connected to a computer 201. The computer 201 may provide a system administrator access to inputs and outputs of the camera cleaning validation system 200. The computer 201 may also control the camera cleaning validation system 200 by adjusting parameters associated with the various components of the camera cleaning validation system 200. Camera 202 or any other cameras discussed in the following figures may be any of the cameras depicted and discussed in FIG. 1. The camera may include a variety of cameras such as wide-field view cameras, stereo cameras, backup cameras, color or monochrome cameras, autonomous vehicle cameras, or any camera that utilizes an optical path. The camera cleaning validation system 200 comprises the camera 202, a power source 204, and object 206, a camera cleaning system 207, and an obstruction source 208. The camera 202 may be positioned in front of the object 206 to capture one or more images of the object 206 under normal conditions and other conditions. A normal condition may be considered a condition where noise, interference, or other image degrading conditions are not introduced to the camera 202. Under its normal condition, the camera 202 captures an optical image as input data from the object. The captured input data may be raw data that is sent to a processing unit associated with the camera device to convert the optical image into processed signals. The camera 202 may be connected to a scoring module 210 that provides camera verification by making a judgment about the raw data to determine if the camera passes a validation threshold. The scoring module 210 may utilize a structural similarity index measurement (SSIM) as a scoring index. The SSIM scoring index may be a perceptual metric that quantifies image quality degradation caused by processing an image. SSIM may provide a measure of the perceptual difference between a before and after images. The camera 202 may capture a plurality of images of object 206 and uses the scoring module 210 to validate each image quality using SSIM. The scoring module 210 may record the values registered based on SSIM. In one or more embodiments, the object 206 may be a spilled coins image, which is typically used to measure a texture sharpness. A spilled coins image is an image processing pattern that allows the evaluation of sharpness. It has a frequency of content pattern which allows it to judge that had a variety of extra detail levels. Other types of sharpness targets do not capture that as well. In one or more embodiments, the obstruction source 208 may introduce the camera 202 to various intensities and different frequencies of radiant energy. The scoring module 210 may provide scores associated with the image qualities of images being captured under the influence of the obstruction source 208.

The scoring module 210 may evaluate a captured image of the object 206 to determine SSIM scores of different regions of the captured image. For example, SSIM scores may be assigned to different regions of the captured image. These SSIM scores would then be compared to a predetermined threshold (e.g., an SSIM score of approximately 0.9). Based on that comparison the scoring module 210 may make a judgment to whether the normal function of the camera 202 has been disrupted based on the SSIM scores resulting from the camera 202 capturing images while being subjected to the obstruction introduced by the obstruction source 208. For example, an image may be first captured by camera 202 under normal conditions (e.g., without influence from the obstruction source 208), which may be referred to as a clean state. This image may be scored by the scoring module 210 using the SSIM scoring index to determine a baseline of SSIM scores in the clean state.

In one or more embodiments, a camera cleaning validation system may capture an image using the camera 202 after an obstruction is applied to the camera lens using the obstruction source 208. This state may be considered as a dirty state. The image may be associated with an obstruction level that has been introduced to the camera 202 using the obstruction source 208. It may be important to capture the SSIM scores associated with the dirty lens before applying the camera cleaning system 207 in order to ensure consistency between tests. That is, having a consistent obstruction level introduced on the lens of camera 202 ensures the validation of a camera cleaning system 207 is consistent over a plurality of tests.

The camera cleaning system 207 may be applied after the camera cleaning validation system captures the image under the dirty state. The camera cleaning system 207 may apply fluids through a nozzle or airflow to the lens in an attempt to remove the obstruction introduced by the obstruction source 208. The application of fluids or airflow may be controlled by the camera cleaning system 207 in order to vary the concentration and pressure of fluids, the speed of the airflow, and/or the angle of the fluid nozzle or the airflow nozzle. In addition, the direction of fluids and airflow may be also controlled by the camera cleaning system 207. At this point, the state of the camera cleaning validation system may be considered a post-cleaning state.

In one or more embodiments, a camera cleaning validation system may capture an image of the object 206 after the application of the camera cleaning system 207. The scoring module 210 may evaluate the image to determine SSIM scores of different regions on the image. For example, SSIM scores may be assigned to different regions of the captured image. These SSIM scores may then be compared to a predetermined threshold (e.g., an SSIM score of approximately 0.9).

In one or more embodiments, a camera cleaning validation system may determine whether the camera's operation has been disrupted to a point to classify the camera cleaning system 207 to be in a failed state. For example, the SSIM scores in the post-clean state may be compared to a validation threshold. In case the SSIM scores are below the validation threshold, the camera cleaning system 207 may be considered to be in a failed state. However, if the SSIM scores are above the validation threshold, the camera cleaning system 207 may be considered to be in a passing state.

It is understood that the above descriptions are for purposes of illustration and are not meant to be limiting.

Figure 3A:
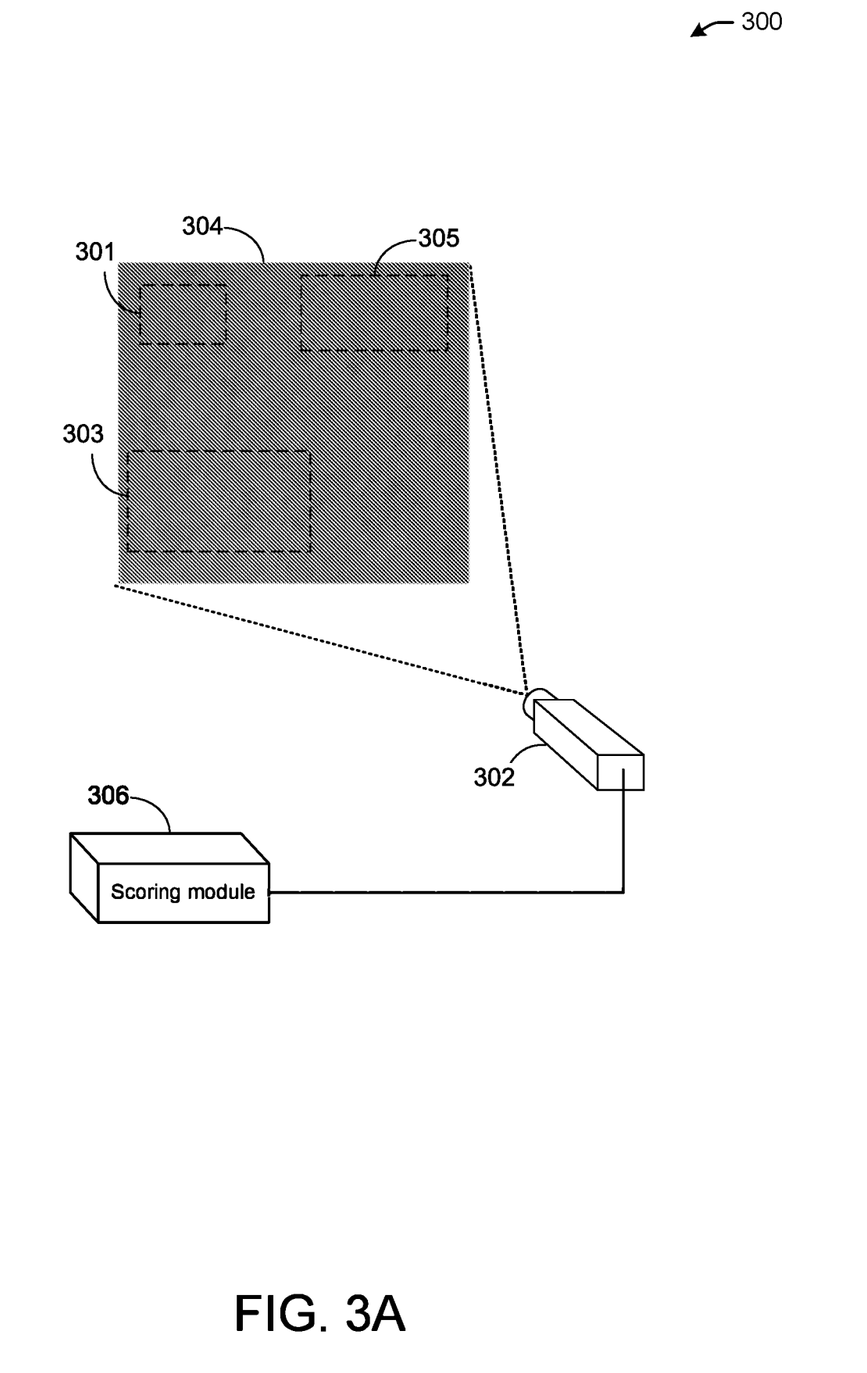
FIG. 3A depicts an illustrative schematic diagram for camera cleaning validation, in accordance with one or more example embodiments of the present disclosure.

FIG. 3A depicts an illustrative schematic diagram 300 for testing and validation of a camera cleaning system, in accordance with one or more example embodiments of the present disclosure.

Referring to FIG. 3A, there is shown a camera 302 pointed to a spilled coins image 304. The camera 302 may be connected to a scoring module 306. The spilled coins image 304 comprises a variety of content frequencies, which makes it suitable for capturing degradations due to environmental interference, such as debris, mud, rain, bugs, or other obstructions that hinder the normal operation of a camera. FIG. 3A represents a normal condition (e.g., a clean state) under which camera 302 is operating. This normal condition, where a minimal to no amount of obstruction may be present, may represent a baseline to be used when comparing images captured of the spilled coins image 304 when camera 302 is subjected to an obstruction.

In FIG. 3A, the spilled coins image 304 may comprise a plurality of regions (e.g., regions 301, 303, 305, etc.), where each of these regions contains content that varies from another region. For example, images of region 301, region 303, and region 305 may result in respective baselines for each of those regions. After an image is captured with the camera 302, a comparison between the baseline image and the captured image may result in a variety of SSIM scores associated with those regions. That is, region 301 may have a different SSIM score than region 303 and region 305. In some embodiments, each of these SSIM scores may be compared to a validation threshold to determine a status of the camera 302. For example, the scoring module 306 may generate SSIM scores for each of the regions 301, 303, and 305 and then compare each of the respective SSIM scores to a validation threshold to determine whether any of these regions are below the validation threshold, which would indicate that the camera 302 may be judged to be in a failed state. For example, if a single region SSIM score is below the validation threshold (e.g., 0.9), then it may be determined that the camera is in a failed state because there is no obstruction applied to the camera, yet it is showing SSIM scores lower than the validation threshold. In some other examples, it may be determined that a certain number of regions SSIM scores have to be below the validation threshold before determining that the camera has failed. Considering that FIG. 3A represents the normal condition under which camera 302 is operating, the SSIM scores associated with the various regions of the spilled coins image 304 may be expected to be above the validation threshold. SSIM is a method for predicting the perceived quality of digital television and cinematic pictures, as well as other kinds of digital images and videos. SSIM is used for measuring the similarity between two images. The SSIM index is a full reference metric. In other words, the measurement or prediction of image quality is based on an initial image or distortion-free image as a reference. SSIM scores may be generated between the normal condition (clean state) of camera images and images taken after the camera 302 is subjected to an obstruction (e.g., a dirty state). These scores are then compared to a validation threshold to determine whether the SSIM scores are below or above the validation threshold.

It is understood that the above descriptions are for purposes of illustration and are not meant to be limiting.

Figure 3B:
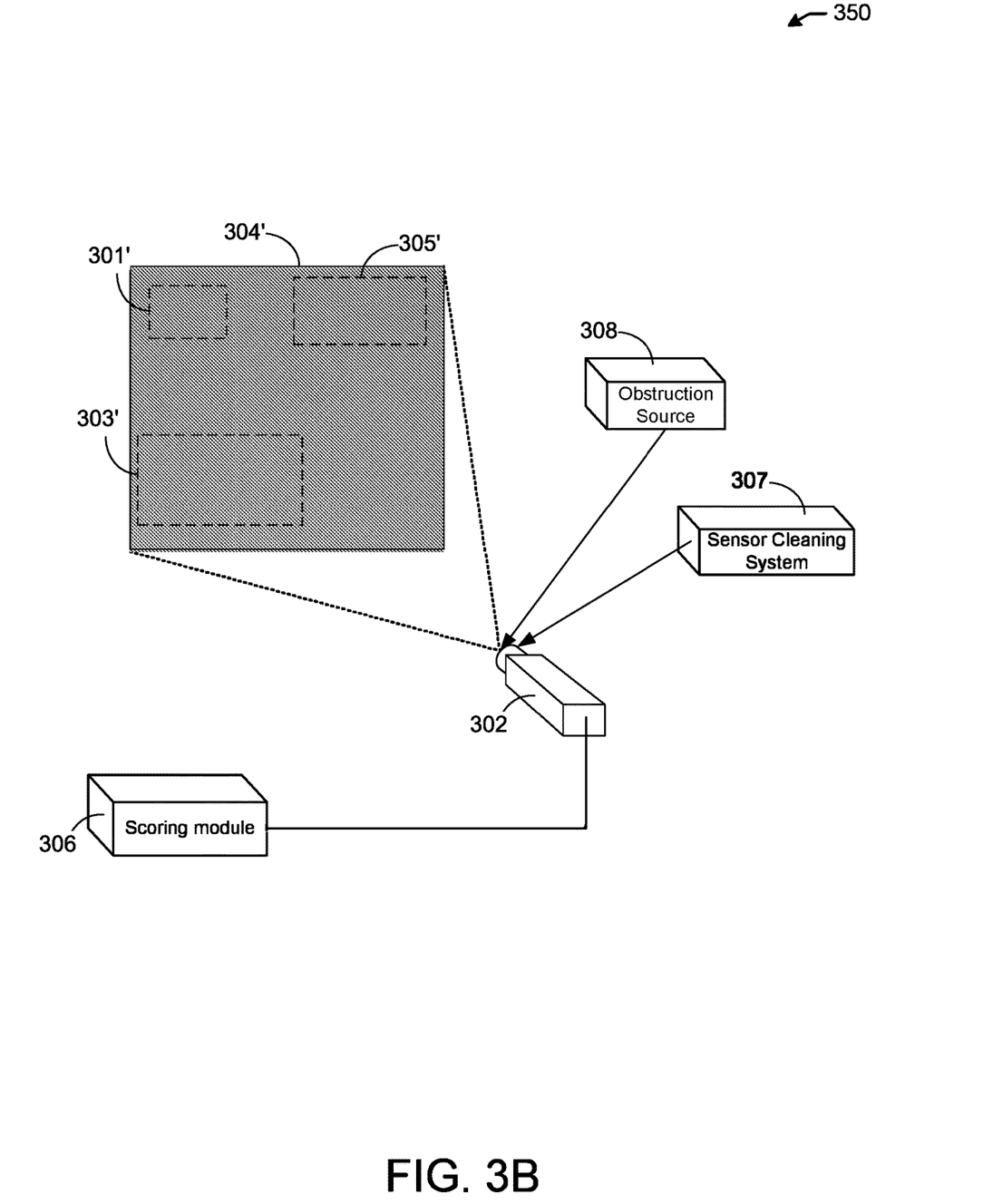
FIG. 3B depicts an illustrative schematic diagram for camera cleaning validation, in accordance with one or more example embodiments of the present disclosure.

FIG. 3B depicts an illustrative schematic diagram 350 for testing and validation of a camera cleaning system, in accordance with one or more example embodiments of the present disclosure.

FIG. 3B depicts a resulting image 304' where the camera 302 captured an image of the spilled coins 304 of FIG. 3A after the application of an obstruction using the obstruction source 308. In FIG. 3A, the testing and validation may start with a camera 302 that is known to operate under normal conditions and determining an expected response to capturing images of a known target (e.g., a spilled coins image). In FIG. 3B, the normal conditions are interrupted by subjecting the lens of camera 302 to an obstruction using the obstruction source 308. The obstruction may include debris, mud, rain, bugs, or other obstructions that hinder the normal operation of the camera 302. This state may be considered as a dirty state. An image may be captured using a predetermined obstruction level introduced to the camera 302 using the obstruction source 308. It is important to capture SSIM scores associated with the dirty lens before applying the camera cleaning system 307 in order to ensure consistency between tests. That is, having a consistent obstruction level introduced on the lens of camera 302 ensures the validation of a camera cleaning system 307 is consistent over a plurality of tests.

In the environment of FIG. 3B, as camera 302 is subjected to an obstruction using the obstruction source 308, the resulting image captured by camera 302 may be degraded due to the obstruction. The camera 302 may be connected to the scoring module 306. As explained above, the spilled coins image 304 of FIG. 3A comprises a variety of content frequencies, which makes it suitable for capturing degradations due to obstructions. While camera 302 is subjected to obstructions, camera 302 may capture optical signals as raw data associated with the variety of regions included in spilled coins image 304 of FIG. 3A. The camera 302 may send the raw data to a processing unit associated with the camera 302 to convert the optical images into processed signals. As was shown in FIG. 3A, the spilled coins image 304 comprised a plurality of regions (e.g., regions 301, 303, 305, etc.). FIG. 3B shows a distorted image 304' due to obstructions introduced by the obstruction source 308. Images may be represented by raw data captured while camera 302 is subjected to obstructions during the capture of optical signals from the spilled coins image 304 in the same regions as represented in regions 301', 303', and 305' which correspond to regions 301, 303, and 305 of FIG. 3A, respectively. Images of region 301', region 303', and region 305' may result in respective image changes for each of those regions due to the obstructions. The scoring module 306 may determine SSIM scores associated with each of those regions by analyzing the raw data, independent of the application of the distorted image 304'. That is, region 301' may have a different SSIM score than region 303' and region 305'.

The camera cleaning system 307 may be applied after capturing the image under the dirty state. The camera cleaning system 307 may apply fluids through a nozzle or airflow to the lens in an attempt to remove the obstruction introduced by the obstruction source 308. The application of fluids or airflow may be controlled by the camera cleaning system 307 in order to vary the concentration and pressure of fluids and the speed of the airflow. In addition, the direction of fluids and airflow may be also controlled by the camera cleaning system 307. At this point, the state of camera 302 may be considered a post-cleaning state. The camera 302 may capture an image of the spilled coins image 304 after the application of the camera cleaning system 307. The scoring module 306 may evaluate the image to determine SSIM scores of different regions on the captured image. For example, SSIM scores may be assigned to different regions of the captured image. These SSIM scores may then be compared to a predetermined threshold (e.g., an SSIM score of approximately 0.9).

In one or more embodiments, a camera cleaning validation system may determine whether the camera's operation has been disrupted to a point to classify the camera cleaning system 307 to be in a failed state. For example, the SSIM scores in the post-clean state may be compared to a validation threshold. In case the SSIM scores are below the validation threshold, the camera cleaning system 207 may be considered to be in a failed state. However, if the SSIM scores are above the validation threshold, the camera cleaning system 207 may be considered to be in a passing state.

Figure 3C:
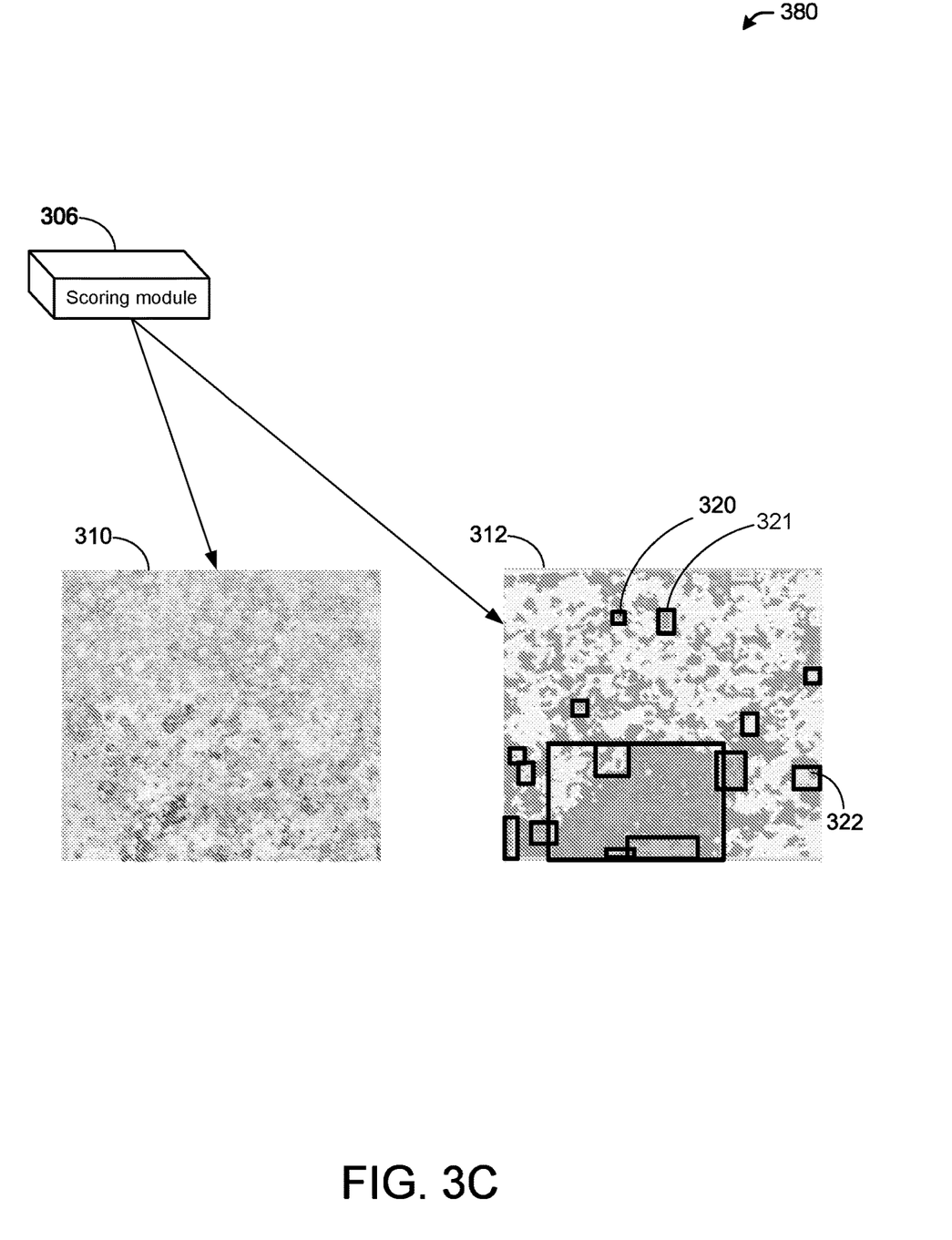
FIG. 3C depicts an illustrative schematic diagram for camera cleaning validation, in accordance with one or more example embodiments of the present disclosure.

FIG. 3C depicts an illustrative schematic diagram 380 for testing and validation a camera cleaning system, in accordance with one or more example embodiments of the present disclosure.

Referring to FIG. 3C, there is shown images 310 and 312 show one or more areas that result in a variety of global scores. For example, image 310 shows the various regions shown with light to dark variation of colors corresponding to an image taken after the obstruction was introduced to the lens of the camera 302.

In one or more embodiments, a camera cleaning validation system may facilitate capturing SSIM scores over a plurality of tests to determine regions of worst SSIM performance of the camera system before and after applying the camera cleaning system 307 to attempt to return the camera to its normal function by clearing the obstruction off of the camera lens.

For example, regions with the worst SSIM (e.g., worst performance) based on a comparison to a validation threshold are represented as boxed areas (e.g., boxed areas 320, 321, and 322, note that not all boxed areas are labeled). A global SSIM may be determined based on capturing an image, down-sampling the image, taking SSIM scores of the down-sampled image, and repeating this process multiple times. A captured image is down-sampled to remove noise resulting from factors such as distance, lighting, resolution, field-of-view, orientation, etc. After down-sampling, SSIM scores are taken of the various regions of the down-sampled image. This process may be repeated multiple times to minimize the effect of noise. The global SSIM score may be determined based on averaging the SSIM scores associated with each down-sampled image. This global SSIM score has the benefit of being independent of setup, quality of the lighting, distance, resolution, field-of-view, orientation, or other camera dependent conditions. Therefore, image 310 shows a resulting image taken of a spilled coins image after the lens of the camera has been subjected to an obstruction. Also, the resulting image is a result of the plurality of image down-sampling and capturing the SSIM scores at each iteration, which are then averaged to generate global SSIM scores of the various regions of the image 310.

In one or more embodiments, a camera cleaning validation system may impose a threshold to create the boxed regions associated with the worst SSIM scores. For example, any SSIM score of image 310 that is greater than the threshold is associated with a lighter color on the global SSIM score and any SSIM score of image 310 that is lower than the threshold may be associated with a darker color on the global SSIM score. It should be understood that darker regions on image 310 represent global SSIM scores that have worse SSIM scores than lighter regions.

In one or more embodiments, the scoring module 306 may convert image 310 into image 312 by determining that regions of darker colors that are connected together are represented by a box drawn around those regions when the connected regions are larger than a given size, for example, 10×10 pixels. Taking 10×10 pixels as an example, regions that are connected together but are smaller than 10×10 pixels may be considered as insignificant imperfection. It should be understood that 10×10 pixels is an example and should not be limiting. Other region sizes may be selected for consideration.

In one or more embodiments, a camera cleaning validation system may facilitate that the system administrator may analyze the global SSIM scores and the boxed regions to determine that they are below the threshold. The system administrator may conclude that the corresponding region of the camera lens has not been properly cleaned using the camera cleaning system 307 of FIG. 3A. This may also indicate either that the fluid nozzle pressure or the airflow speed may need to be adjusted to address those regions in an attempt to restore the camera lens to its original operating state. This analysis may also indicate whether the camera cleaning system 307 does not pass the operating threshold and may be considered to be defective. However, if the camera cleaning system 307 was capable of correcting the boxed region by clearing the obstruction from those regions having a low SSIM score, then the camera cleaning system may be considered to pass the operating threshold and may be considered to be in an operational state. It is understood that the above descriptions are for purposes of illustration and are not meant to be limiting.

Figure 4:
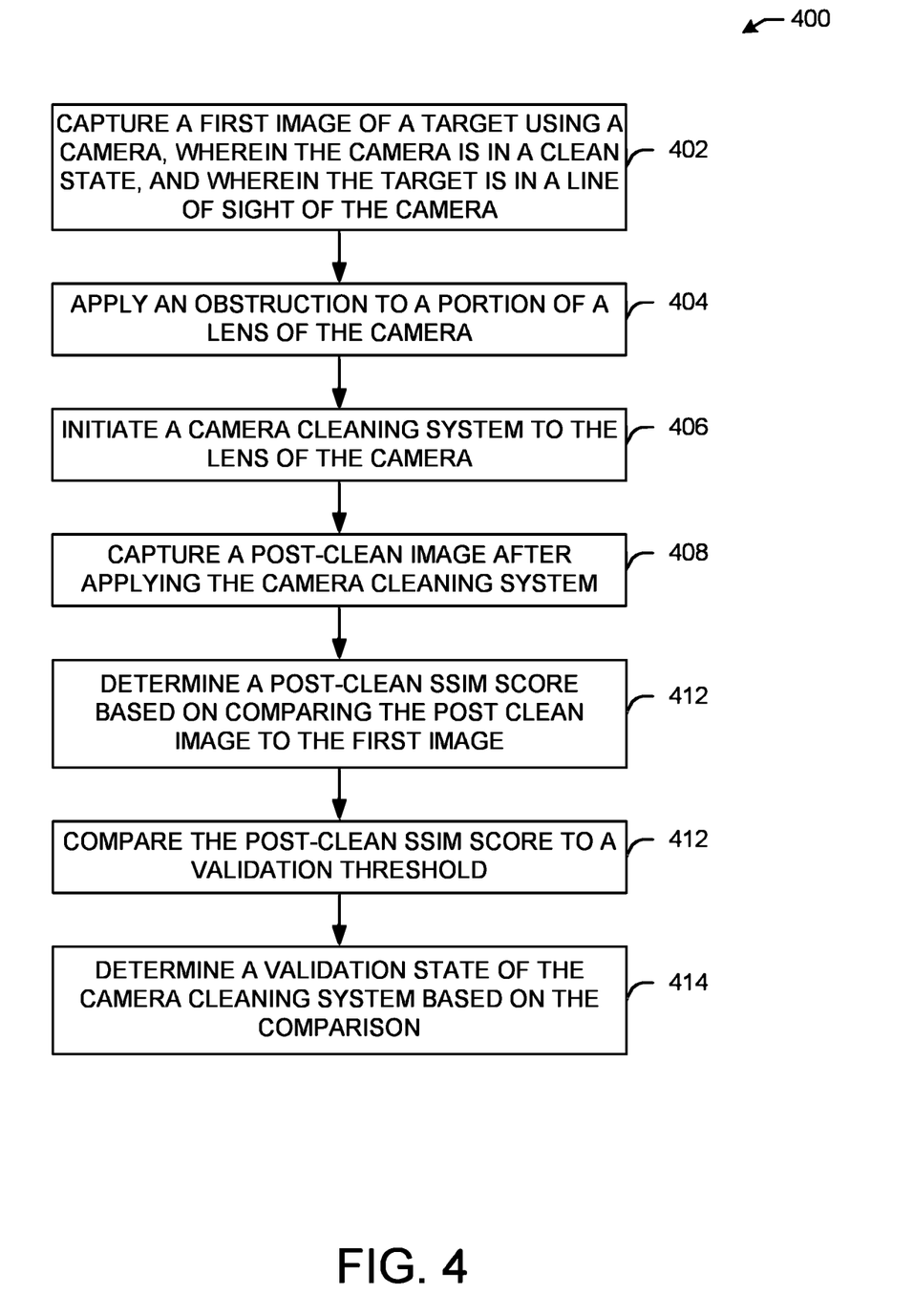
FIG. 4 illustrates a flow diagram of an illustrative process for a camera cleaning validation system, in accordance with one or more example embodiments of the present disclosure.

FIG. 4 illustrates a flow diagram of illustrative process 400 for a camera cleaning validation system, in accordance with one or more example embodiments of the present disclosure.

At block 402, a device may capture a first image of a target using a camera, wherein the camera is in a clean state, and wherein the target is in a line of sight of the camera.

At block 404, the device may apply an obstruction to a portion of a lens of the camera.

At block 406, the device may apply a camera cleaning system to the lens of the camera.

At block 408, the device may capture a post-clean image after applying the camera cleaning system.

At block 410, the device may determine a post-clean SSIM score based on comparing the post clean image to the first image. The device may determine a first down-sampled image based on the down-sampling the post-clean image. The device may determine a first local SSIM score based on comparing the first image and the post-clean down-sampled image. The device may determine a second down-sampled image based on the down-sampling of the first down-sampled image. The device may determine a second local SSIM score based on comparing the first down-sampled image and the second down-sampled image. The device may determine a global SSIM score, wherein the global SSIM score is an average of the first local SSIM score and the second local SSIM score. The device may determine a first region of the post-clean image having SSIM scores below a validation threshold. The device may determine a second region of the post-clean image having SSIM scores below the validation threshold. The device may determine the first region and the second region are connected together. The device may display a box around the first region and the second region. The device may flag the displayed box as a degraded area that has a worse SSIM score than an area without a box around it.

At block 412, the device may compare the post-clean SSIM score to a validation threshold.

At block 414, the device may determine a validation state of the camera cleaning system based on the comparison. The device may perform one or more adjustments to the camera cleaning system to mitigate the degraded area.

It is understood that the above descriptions are for purposes of illustration and are not meant to be limiting.

Figure 5:
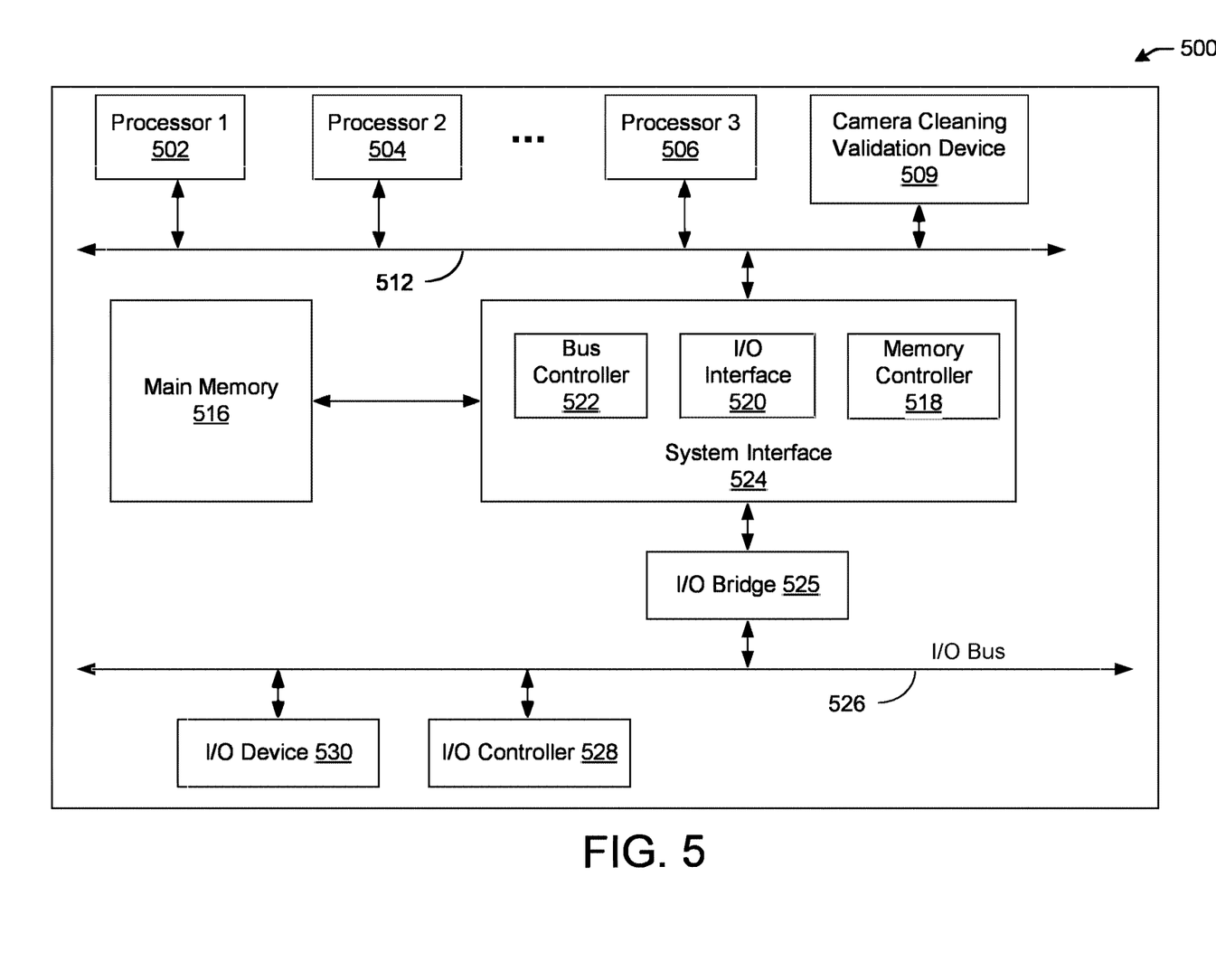
FIG. 5 is a block diagram illustrating an example of a computing device or computer system upon which any of one or more techniques (e.g., methods) may be performed, in accordance with one or more example embodiments of the present disclosure.

FIG. 5 is a block diagram illustrating an example of a computing device or computer system 500 upon which any of one or more techniques (e.g., methods) may be performed, in accordance with one or more example embodiments of the present disclosure.

For example, the computing system 500 of FIG. 5 may represent the vehicle computer 105 and/or the auxiliary operations computer 110 of FIG. 1 and/or the computer 201 of FIG. 2. The computer system (system) includes one or more processors 502-506. Processors 502-506 may include one or more internal levels of cache (not shown) and a bus controller (e.g., bus controller 522) or bus interface (e.g., I/O interface 520) unit to direct interaction with the processor bus 512. A camera cleaning validation device 509 may also be in communication with the Processors 502-506 and may be connected to the processor bus 512.

Processor bus 512, also known as the host bus or the front side bus, may be used to couple the processors 502-506 and/or the camera cleaning validation device 509 with the system interface 524. System interface 524 may be connected to the processor bus 512 to interface other components of the system 500 with the processor bus 512. For example, system interface 524 may include a memory controller 518 for interfacing a main memory 516 with the processor bus 512. The main memory 516 typically includes one or more memory cards and a control circuit (not shown). System interface 524 may also include an input/output (I/O) interface 520 to interface one or more I/O bridges 525 or I/O devices 530 with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506 and/or the camera cleaning validation device 509. Another type of user input device includes cursor control, such as a mouse, a trackball, or cursor direction keys for communicating direction information and command selections to the processors 502-506 and/or the camera cleaning validation device 509 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506 and/or the my camera cleaning validation device 509. Main memory 516 also may be used for storing temporary variables or other intermediate information during execution of instructions by the processors 502-506 and/or the camera cleaning validation device 509. System 500 may include read-only memory (ROM) and/or other static storage device coupled to the processor bus 512 for storing static information and instructions for the processors 502-506 and/or the camera cleaning validation device 509. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 and/or the camera cleaning validation device 509 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A camera cleaning validation system comprising:
   a camera with a lens; and
   a processor configured to:
   cause the camera to capture a baseline image when the lens is a clean state,
   after a cleaning system has initiated a cleaning operation to remove a detected obstruction from the lens, cause the camera to capture a post clean image after the cleaning operation,
   generate a post-clean image quality score based on a comparison between the baseline image and the post clean image by:
   performing a first down-sampling operation of the post clean image to generate a first down-sampled image, and
   determining a first image quality score for the first down-sampled image based on comparing the baseline image and the first down-sampled image, the first image quality score being a first local image quality score, and determine an operational state of the cleaning system in response to the post-clean image quality score being less than a validation threshold.

2. The camera cleaning validation system of claim 1, wherein the image quality score comprises a structural similarity index measurement (SSIM) score.

3. The camera cleaning validation system of claim 1, wherein the processor is also configured to adjust at least one parameter of the cleaning system in response to the operational state corresponding to a non-performing state.

4. The camera cleaning validation system of claim 1, wherein the processor is further configured to:

perform a second down-sampling operation of the first down-sampled image to generate a second down-sampled image; and determine a second image quality score for the second down sampled image, the second image quality score being a second local image quality score.

5. The camera cleaning validation system of claim 4, wherein the processor is further configured to:

generate a global image quality score representing an average of the first local image quality score and the second local image quality score.

6. The camera cleaning validation system of claim 5, wherein the processor is further configured to:

identify, based on the global image quality score, regions of interest in the post clean image, the regions of interest corresponding to locations on the lens that have not been properly cleaned.

7. The camera cleaning validation system of claim 1, wherein the processor is further configured to:

identify a first region of the post clean image having image quality scores below the validation threshold;

identify a second region of the post clean image having image quality scores below the validation threshold; and determine that the first region and the second region are connected together.

8. The camera cleaning validation system of claim 7, wherein the processor is further configured to:

display a bounding box around the first region, around the second region, or around the first region and the second region in response to the first region, the second region, or a combined size of the first region and second region spanning an area greater than a predetermined pixel size.

9. The camera cleaning validation system of claim 8, wherein the processor is further configured to:

classify the displayed bounding box as a degraded area that has a worse image quality score than an area without a box around it; and adjust at least one parameter of the cleaning system to mitigate the degraded area.

10. The camera cleaning validation system of claim 2, wherein the at least one parameter of the cleaning system comprises an airflow speed of the cleaning system.

11. A sensor cleaning validation system comprising:

a processor configured to:

control a cleaning system to initiate a cleaning operation to remove an obstruction from a lens of a sensor, cause the sensor to capture a post clean image after the cleaning operation, generate an image quality score based on a comparison between a baseline image and the post clean image, the baseline image corresponding to an image captured when the lens is determined to be in a clean state, by:

performing a first down-sampling operation of the post clean image to generate a first down-sampled image, and determining a first image quality score for the first down-sampled image based on comparing the baseline image and the first down-sampled image, the first image quality score being a first local image quality score, determine an operational state of the cleaning system in response to the image quality score being less than a validation threshold, and adjust at least one parameter of the cleaning system in response to the operational state corresponding to a non-performing state.

12. A sensor cleaning validation method comprising:

causing, by a processor, a camera to capture a baseline image when a lens of the camera being in a clean state;

controlling, by the processor, a cleaning system to initiate a cleaning operation to remove a detected obstruction from the lens;

causing, by the processor, the camera to capture a post clean image after the cleaning operation;

generating, by the processor, an image quality score based on comparing the baseline image and the post clean image, by:

performing a first down-sampling operation of the post clean image to generate a first down-sampled image, and determining a first image quality score for the first down-sampled image based on comparing the baseline image and the first down-sampled image, the first image quality score being a first local image quality score; and determining, by the processor, an operational state of the cleaning system based on comparing the image quality score and a validation threshold.

13. The method of claim 12, further comprising adjusting, by the processor, at least one parameter of the cleaning system in response to the operational state corresponding to a non-performing state.

14. The method of claim 12 further comprising:

performing a second down-sampling operation of the first down-sampled image to generate a second down-sampled image; and determining a second image quality score for the second down-sampled image, the second image quality score being a second local image quality score.

15. The method of claim 14 further comprising:

generating a global image quality score representing an average of the first local image quality score and the second local image quality score.

16. The method of claim 15 further comprising:

identifying, based on the global image quality score, regions of interest in the post clean image, the regions of interest corresponding to locations on the lens that have not been properly cleaned.

17. The method of claim 13 further comprising:

identifying a first region of the post clean image having image quality scores below the validation threshold;

identifying a second region of the post clean image having image quality scores below the validation threshold; and determining that the first region and the second region are connected together.

18. The method of claim 17 further comprising:
displaying a bounding box around the first region, around the second region, or around the first region and the second region in response to the first region, the second region, or a combined size of the first region and second region spanning an area greater than a predetermined pixel size.

19. The method of claim 18 further comprising:
classifying the displayed bounding box as a degraded area that has a worse image quality score than an area without a box around it; and
adjusting at least one parameter of the cleaning system to mitigate the degraded area.

20. The method of claim 13, wherein the at least one parameter of the cleaning system comprises at least one of a fluid concentration and a fluid pressure of the cleaning system.

* * * * *